US007747511B1

(12) United States Patent
Conway et al.

(10) Patent No.: US 7,747,511 B1
(45) Date of Patent: Jun. 29, 2010

(54) METHOD AND SYSTEM FOR ISSUING TREASURY EQUITY-LINKED LETTERS OF CREDIT

(75) Inventors: Elliot Stewart Conway, Locust Valley, NY (US); Herman Hirsch, New York, NY (US); Alfred Wilson Griffin, III, New York, NY (US); William G. Ortner, Scarsdale, NY (US)

(73) Assignee: Citigroup Global Markets Inc., New York, NY (US)

( * ) Notice: Subject to any disclaimer, the term of this patent is extended or adjusted under 35 U.S.C. 154(b) by 1037 days.

(21) Appl. No.: 11/432,572

(22) Filed: May 10, 2006

Related U.S. Application Data

(60) Provisional application No. 60/679,637, filed on May 10, 2005.

(51) Int. Cl.
*G06Q 40/00* (2006.01)
(52) U.S. Cl. ....................................................... 705/37
(58) Field of Classification Search ............. 705/35–37; 707/1–6
See application file for complete search history.

(56) References Cited

U.S. PATENT DOCUMENTS

| | | | | |
|---|---|---|---|---|
| 5,758,097 A | * | 5/1998 | Debe et al. ..................... 705/35 |
| 2003/0033240 A1 | * | 2/2003 | Balson et al. .................. 705/37 |
| 2003/0046218 A1 | * | 3/2003 | Albanese et al. .............. 705/37 |

OTHER PUBLICATIONS

Goldbaltt, "Trend: shorting for accelerated buyback programs. (stock buyback programs being used)", American Banker, v162, n48, p. 18(1), Mar. 12, 1997.*

* cited by examiner

*Primary Examiner*—Mary Cheung
(74) *Attorney, Agent, or Firm*—Milbank, Tweed, Hadley & McCloy LLP

(57) ABSTRACT

In a system and method for managing risk of fluctuation on company share prices, a financial institution sells a put to a company on a specified number of shares of stock of the company, the put including a strike price that is a predetermined percentage less than a market price of the shares of stock of the company. The financial institution also purchases a call from the company on the specified number of shares of stock of the company, the call including a strike price that is a predetermined percentage greater than the market price of the shares of stock of the company.

36 Claims, 9 Drawing Sheets

| | After 3 Years | After 5 Years | After 7 Years |
|---|---|---|---|
| Stock Price | $40.00 | $40.00 | $40.00 |
| Remaining Tenor | 9 years | 7 years | 5 years |
| Collar Terms | 60% ($24) - 200% ($80) | 60% ($24) - 195.7% (78.27) | 60% ($24) - 185.0% ($74.02) |
| Dividend Increase | $0.10 | $0.20 | $0.30 |
| Transaction Value | -3.91% | -4.14% | -3.15% |
| Delta Adjusted Dividend | 0.25%<br>$0.10 x 50 mm shares x 37.5% delta | 0.50%<br>$0.20 x 50 mm shares x 30.6% delta | 0.75%<br>$0.30 x 50 mm shares x 23.5% delta |
| New Transaction Value | -3.66% | -3.64% | -2.40% |
| New Floor Price / Cap Price | 60% ($24) - 195.7% (78.27) | 60% ($24) - 185.0% ($74.02) | 60% ($24) - 167.5% ($67.00) |

| | After 3 Years | After 5 Years | After 7 Years |
|---|---|---|---|
| Stock Price | $40.00 | $40.00 | $40.00 |
| Remaining Tenor | 9 years | 7 years | 5 years |
| Collar Terms | 60% ($24) - 200% ($80) | 60% ($24) - 195.7% (78.27) | 60% ($24) - 185.0% ($74.02) |
| Dividend Increase | $0.10 | $0.20 | $0.30 |
| Transaction Value | -3.91% | -4.14% | -3.15% |
| Delta Adjusted Dividend | 0.25% | 0.50% | 0.75% |
| | $0.10 x 50 mm shares x 37.5% delta | $0.20 x 50 mm shares x 30.6% delta | $0.30 x 50 mm shares x 23.5% delta |
| New Transaction Value | -3.66% | -3.64% | -2.40% |
| New Floor Price / Cap Price | 60% ($24) - 195.7% (78.27) | 60% ($24) - 185.0% ($74.02) | 60% ($24) - 167.5% ($67.00) |

FIG. 5

METHOD AND SYSTEM FOR ISSUING TREASURY EQUITY-LINKED LETTERS OF CREDIT

This application claims priority to U.S. Provisional Patent Application Ser. No. 60/679,637, filed May 10, 2005, entitled METHOD AND SYSTEM FOR ISSUING TREASURY EQUITY-LINKED LETTERS OF CREDIT, the disclosure of which is incorporated herein by reference.

BACKGROUND

The invention relates to the field of financial instruments.

One known financial instrument is an equity collar, which is comprised of a combination of an equity put and an equity call. An equity collar around the current stock price is created by purchasing a put option with a strike price at or below the current stock price and selling a call option with a strike price above the current stock price. Investors use an equity collar to hedge their exposure to stock price fluctuations. By establishing an equity collar, a minimum and maximum market value is created around the investor's equity position until the options expire.

Systems and methods are needed to allow a company to hedge or manage fluctuations in their own stock price.

One of the methods used by businesses to raise funds is through the use of letters of credit, and many letters of credit are secured by company assets that are pledged in support of the letter of credit.

Insurance companies have reserve requirements that may impact the company's underlying credit or assets.

Systems and methods are needed that support the issuance of letters of credit and that do not consume a company's credit capacity.

The preceding description is not to be construed as an admission that any of the description is prior art relative to the present invention.

SUMMARY OF THE INVENTION

The various aspects of the embodiments provide a system and method for managing risk associated with fluctuations in a company's share price. The system and method comprise selling a put to the company on a specified number of shares of stock of the company, the put including a strike price that is a predetermined percentage less than a market price of the shares of stock of the company. The system and method further comprise purchasing a call from the company on the specified number of shares of stock of the company, the call including a strike price that is a predetermined percentage greater than the market price of the shares of stock of the company.

In another aspect, the system and method further comprise hedging the put by net short selling a predetermined number of shares of the stock of the company. In one aspect, the predetermined number of shares is approximately fifty percent of the specified number of shares. In another aspect, the system and method further comprise adjusting the hedge by buying or selling shares of the stock of the company. In another aspect, the system and method further comprise adjusting the call strike price down when the company pays a dividend on the shares of stock. In one aspect, the put and the call have respective expiration terms, the system and method further comprising extending the expiration terms. In one aspect, extending the expiration terms further comprises calculating a present value of any payments due from the company under the put and the call without extending the expiration terms, calculating an unwind value of the put and call without extending the expiration terms, calculating a present value of any payments due from the company under extended expiration terms, and solving for an extended term put strike price and an extended term call strike price using the present value of any payments due from the company under the put and the call without extending expiration terms, the unwind value of the put and call, and the present value of any payments due from the company under extended expiration terms. In one aspect, extending the expiration terms occurs approximately one year after selling the put and purchasing the call. In one aspect, the market price of the shares of stock of the company is a current market price. In one aspect, the predetermined percentage less than a market price of the shares of stock of the company is between zero percent less and sixty percent less. In one aspect, the put and the call have equal terms. In one aspect, the put has a term between about ten years and twelve years. In one aspect, the call has a term between about ten years and twelve years. In one aspect, the predetermined percentage greater than the stock price is adjusted so that value received for the put and value paid for the call are approximately equal. In one aspect, the predetermined percentage less than the stock price is adjusted so that value received for the put and value paid for the call are approximately equal. In one aspect, the same counterparty sells the put to the company and purchases the call from the company. In one aspect, the put and the call have respective expiration terms, the system and method further comprising receiving from the company shares of stock of the company before the expiration terms. In one aspect, the system and method further comprise delivering value to the company in exchange for receiving the shares of stock of the company. In another aspect, the system and method further comprise entering into a call spread contract with the company. In one aspect, the put strike price is a floor price and the call strike price is a ceiling price, and wherein entering into the call spread contract further comprises entering into a first leg of the call spread with a first leg call strike price at the floor price, and entering into a second leg of the call spread with a second leg call strike price at the ceiling price. In another aspect, the system and method further comprise issuing a letter of credit with a value that is substantially equal to the strike price of the put multiplied by the specified number of shares of stock. In another aspect, the system and method further comprise receiving a pledge from the company of the specified number of shares of stock. In another aspect, the system and method further comprise syndicating an instrument used to fund the letter of credit in the event the letter of credit is drawn. In another aspect, the system and method further comprise receiving a pledge of the put from the company. In one aspect, the company places the specified number of shares of stock in a custodial account. In one aspect, the letter of credit is a first letter of credit that is issued to an entity that is substantially owned by the company. In one aspect, the entity is newly formed by the company. In one aspect, the entity is consolidated with the company. In one aspect, the entity issues a second letter of credit to the company. In one aspect, the entity is a reinsurance company. In one aspect, the first letter of credit satisfies XXX or AXXX reserve requirements. In one aspect, the letter of credit has a term between about ten years and twelve years. In one aspect, the put, the call, and the letter of credit have equal terms.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein:

FIG. 5 illustrates a technique for computing a new call strike price after a dividend increase;

It is understood that the drawings are for illustration only and are not limiting.

DETAILED DESCRIPTION OF THE DRAWINGS

The embodiments described herein create an equity collar that a company uses to manage risk from fluctuations in the company share price. Companies have a number of possible uses for such an equity collar. One of those uses is in conjunction with a long term letter of credit capacity using a company's un-issued treasury shares. This letter of credit does not depend on a company's underlying credit, or assets. Credit support for the letter of credit is a pledge of the company treasury shares plus an equity collar against the company stock. In one embodiment, the equity collar is struck at a specific percentage below the current share price and a specific percentage above the current share price. In one embodiment, the percentages are adjusted so that the net cost of the put and call is zero. The transaction is non-dilutive for GAAP unless the share price goes above the collar. By relying on the company's untapped capacity to issue shares in the future, the facility does not consume the company's credit capacity as would some other letters of credit, debt, or credit linked notes. The 10-12 year letter of credit generally exceeds the typical 5+ year letter of credit, and is non-recourse to other assets of the company.

An Example System

Figure 1:
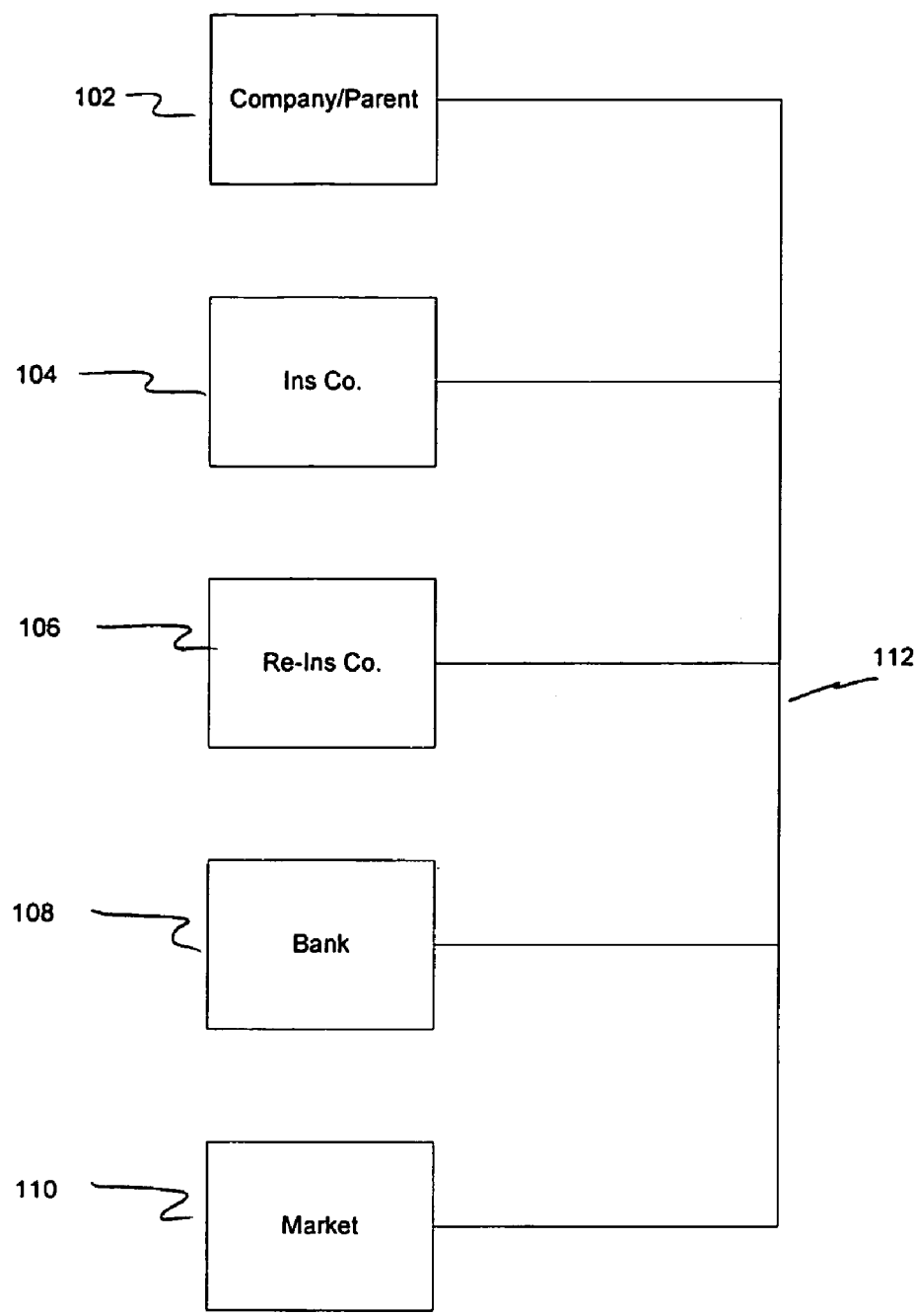
FIG. 1 illustrates an example system according to an embodiment.

Referring to FIG. 1, an example system 100 according to one embodiment includes a parent company 102, a first entity such as an insurance company 104 and a second entity such as a re-insurance company 106. System 100 also includes a financial institution, such as a bank 108 and a market 110 for hedging. Although not illustrated, some or all of parent company 102, entities 104 and 106, financial institution 108, and market 110 have computers that include central processors (CPUs), memory (volatile, non-volatile, RAM, ROM, EPROM etc.), fixed and removable code storage devices (floppy drives, hard drives, DVDs, CDs, flash memory sticks, etc.), input/output devices (keyboards, display monitors, pointing devices, printers, etc.) and communication or network interface devices (Ethernet cards, WiFi cards, modems, etc.). Parent company 102, entities 104 and 106, financial institution 108, and market 110 are inter-connected by network 112, which may be a LAN, WAN, an intranet, an extranet, the Internet, the PSTN, etc. Computer executable software code is stored on the fixed and removable code storage devices, and is also transferred as an information signal, such as by download.

It is envisioned that system 100 may include less than all of the entities illustrated in FIG. 1, such as for example only company 102, financial institution 108 and market 110. Or, company 102, entity 104, financial institution 108 and market 110. Or, company 102, entity 106, financial institution 108 and market 110. Or, entity 104, entity 106, financial institution 108 and market 110.

Example Methods

Figure 2:
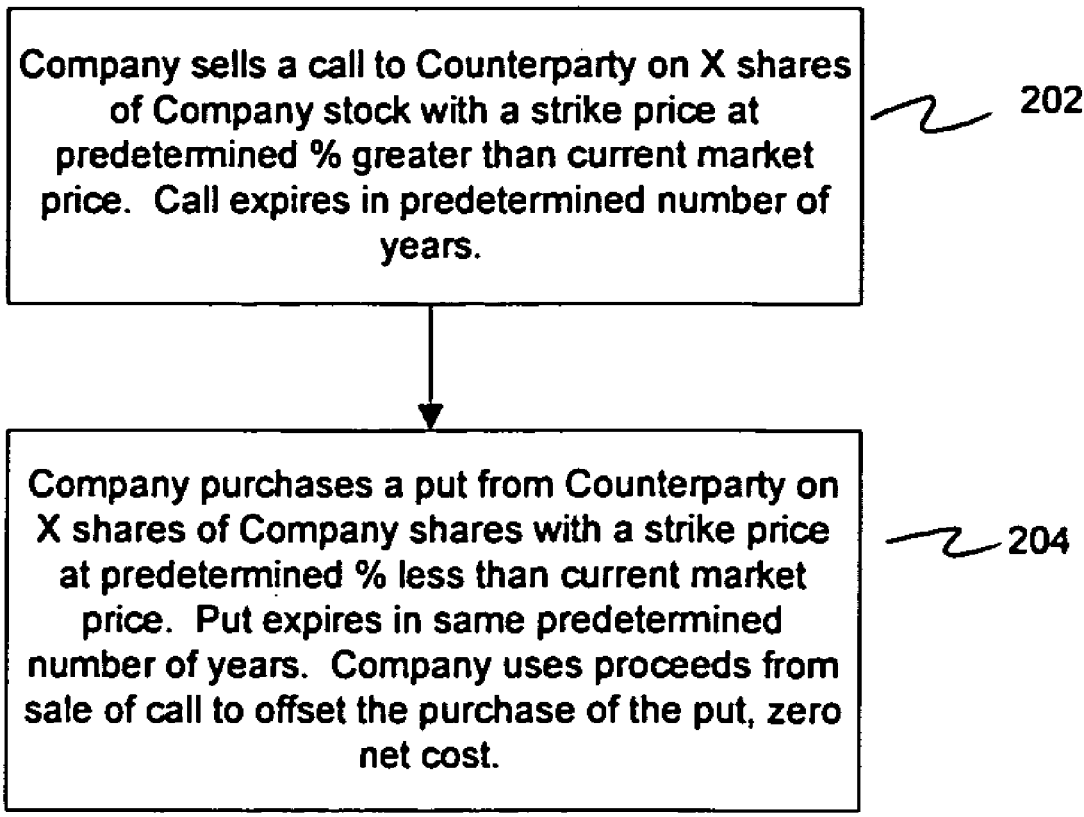
FIG. 2 illustrates an example method according to an embodiment.

One example embodiment is illustrated in FIG. 2. At step 202, company 102 sells a call to counterparty 108 on a specified number of shares of company common stock. The call has a strike price that is a predetermined percentage greater than the current market price of the company common stock. The call expires in a predetermined number of years.

At step 204, company 102 purchases a put from counterparty 108 on the specified number of shares of company common stock. The put has a strike price that is a predetermined percentage less than the current market price of the company common stock. The put generally expires in the same predetermined number of years as the call. In one embodiment, the percentages above and below the current market price are adjusted so that the net cost to company 102 of selling the call and purchasing the put is zero. In another embodiment, the call strike price is higher to allow additional upside for the company. This normally requires payment of an additional premium on the collar by the company to receive the additional possible upside.

Figure 3:
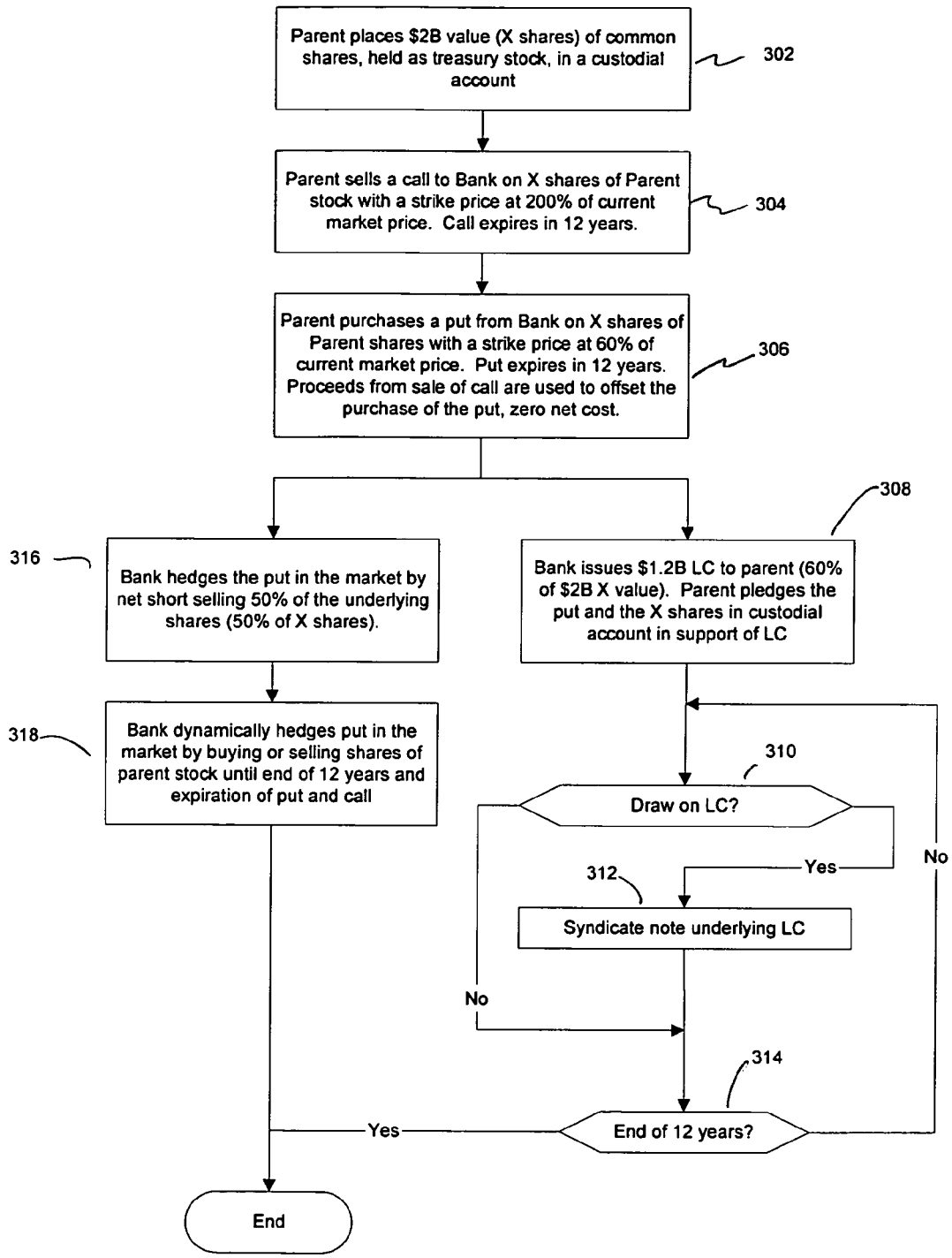
FIG. 3 illustrates an example method according to an embodiment.

Another example embodiment is illustrated in FIG. 3. At step 302, company 102 places a specified number of shares of company common stock in a custodial account that is controlled by the company. These shares are held as treasury stock and, as described, holding the shares in the custodial account has certain advantages.

At step 304, company 102 sells a call to financial institution 108 on the specified number of shares of company common stock. The call has a strike price that is a predetermined percentage greater than the market price of the company common stock that is held in the custodial account. In one embodiment, the call expires between about 10 and 12 years.

At step 306, company 102 purchases a put from financial institution 108 on the specified number of shares of company common stock. The put has a strike price that is a predetermined percentage less than the market price of the company common stock that is held in the custodial account. In one embodiment, the put expires between about 10 and 12 years, or at the same time the call expires. In one embodiment, the strike price of the call sold in step 304 is set so that the total cost of the put and the total cost of the call are approximately equal, meaning that there is no net expense for the put and call. In one embodiment, the strike price of the put purchased in step 306 is set so that the total cost of the put and the total cost of the call are approximately equal, meaning that there is no net expense for the put and call. This combination of a put and a call is an equity collar, as discussed above. This reduces the downside exposure of the company long stock position and minimizes the upfront expense of hedging, in effect "collaring" the future sale price of the stock. The put protects the value of the investment against a drop in the share price. The call offsets the cost of the put, while allowing the company to retain some upside potential. If the stock price rises above the call strike price the company will likely have to account for the call option using treasury stock method accounting.

At step 308, financial institution 108 issues a letter of credit to company 102. As a guarantee for the letter of credit, company 102 pledges the specified number of shares held in the custodial account, and also pledges the put. The term of the letter of credit is generally the same as the term of the put and the call, or between about 10 and 12 years.

The strike price of the put and the specified number of shares generally establish the value of the letter of credit that financial institution 108 provides in step 308. In one embodiment, the value of the letter of credit is approximately equal to the strike price of the put multiplied by the number of shares of common stock in the custodial account. For example, with a $40 current market price of the company common stock and $2 B worth of shares transferred to and held in the custodial account (i.e., 50M shares), if the put strike is 60% of the current market price ($24) and the call strike price is 200% of the current market price ($80), then the letter of credit value is $1.2 B ($24*50M).

Transfer of the shares to the custodial account is non-dilutive from an accounting perspective because the shares are not issued, they are just pledged.

At step 310, system 100 determines whether there is a draw on the letter of credit, and if there is a draw, then at step 312 financial institution 108 syndicates the note from parent 102 that underlies the letter of credit. If or when the letter of credit is drawn, company 102 will show it as debt, and interest may be tax deductible.

At step 314, system 100 determines whether the terms of the letter of credit, the put and the call have expired and if so, the process ends. If not, system 100 loops to step 310.

If at step 310, there is no draw on the letter of credit, then at step 314, system 100 determines whether the terms of the letter of credit, the put and the call have expired.

After financial institution 108 sells the put at step 306, then at step 316 financial institution 108 hedges the put by net short selling a predetermined number of shares of the underlying company common stock in market 110. In one embodiment, the predetermined number of shares is 50%, and in the example above, the net short sale would be 25M shares.

At step 318, financial institution 108 dynamically hedges the put by either buying or selling shares of company common stock in market 110. This dynamic hedge continues until the end of the term of the put and call, between about 10 and 12 years. An objective of the hedge is to be fully hedged at the end of the term if the put will be in the money at the end of the term, and to be completely un-hedged at the end of the term if the put will be out of the money at the end of the term.

The system and method described above with reference to FIGS. 1-3 have applicability to almost any company.

Figure 4:
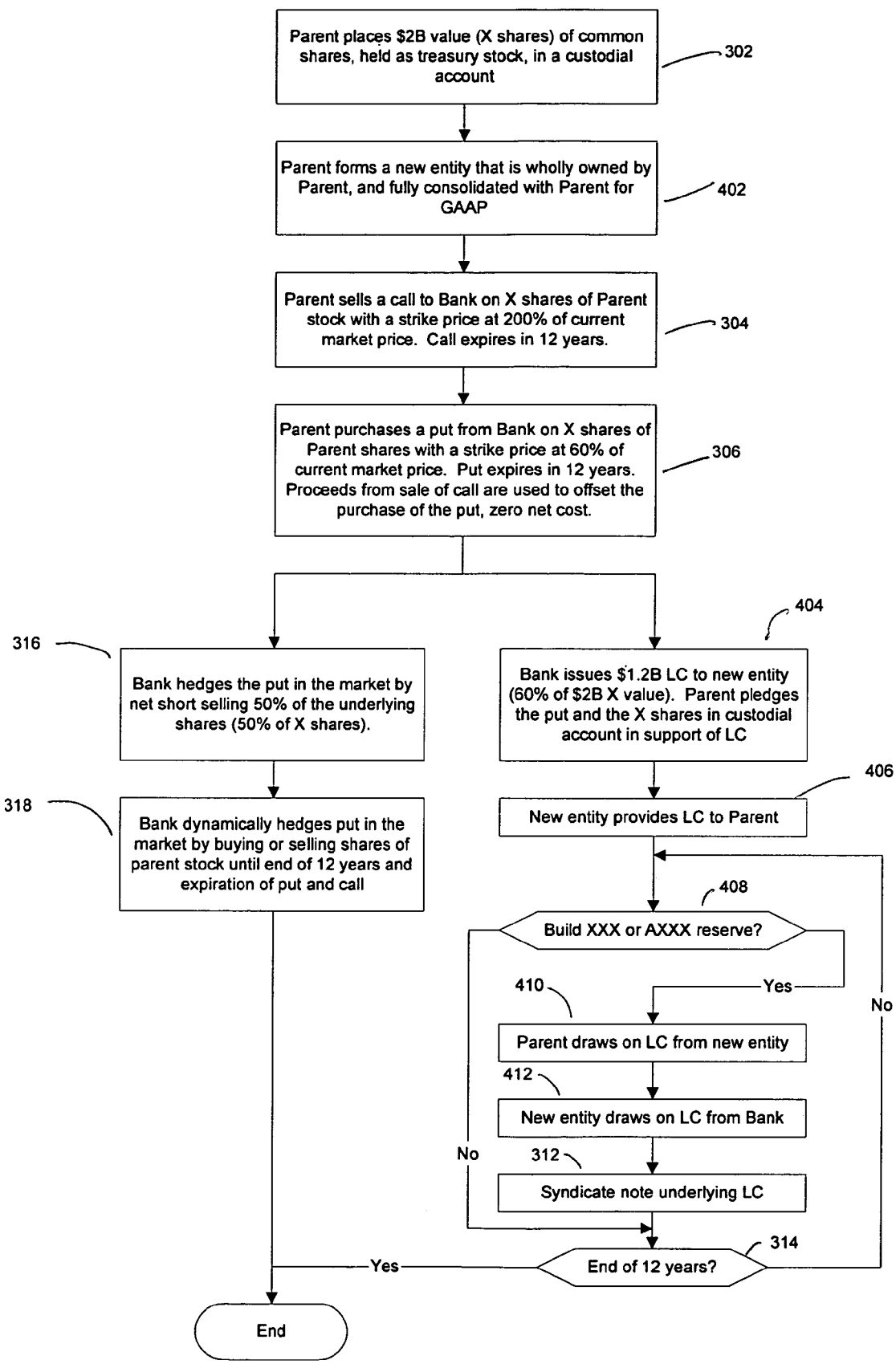
FIG. 4 illustrates an example method according to an embodiment.

FIG. 4 illustrates another example embodiment that has particular applicability to insurance and re-insurance companies. As background, the National Association of Insurance Commissioners (NAIC) adopted a Model Regulation entitled "Valuation of Life Insurance Policies," also known as Regulation XXX. The NAIC also adopted the related Actuarial Guideline XXXVIII: The Application of the Valuation of Life Insurance Policies Model Regulation (AXXX). Both Regulation XXX and AXXX specify reserve requirements for companies that issue life insurance policies. A letter of credit can be used to help satisfy these reserve requirements.

A 10-12 year term for a letter of credit is good for XXX and AXXX needs. However, there is also a tension between a long term, and hedging in the derivatives market. Thus, 10-12 years is within the time that a bank is willing to issue a letter of credit. For a longer term, the range of the collar might have to change.

Referring to FIG. 4, steps 302, 304, 306, 312, 314, 316 and 318 are substantially the same as or identical to the similarly numbered steps of FIG. 3, which are described above. At step 402, if not already formed, company 102 forms a new entity 106 (e.g., a reinsurance company) that is wholly owned and fully consolidated with company 102 for GAAP.

After financial institution 108 sells the put and purchases the call in steps 304 and 306, then at step 404, financial institution 108 issues a letter of credit to entity 106. As a guarantee and in exchange for the letter of credit, company 102 pledges the put and the specified number of shares held in the custodial account.

At step 406, entity 106 issues a second letter of credit to company 102. The value of this second letter of credit is substantially the same as the first letter of credit issued at step 404.

At step 408, company 102 or entity 106 determine whether XXX or AXXX reserves need to be increased, and if so, at step 410 company 102 draws on the second letter of credit from entity 106, and at step 412, entity 106 draws on the first letter of credit from financial institution 108.

Adjustments of Call Strike Price Upon Dividend

During the 10-12 year term of the letter of credit, if company 102 pays or increases a dividend, then financial institution 108 will owe more money to market 110. The value owed to financial institution 108 can be paid for by lowering the call strike price.

Step 1 Transaction value: value the transaction on the dividend ex-date using then-current inputs (time remaining to expiration, stock price, and LIBOR rates) with the existing put and call prices and dividend assumption ($0.40), taking note of the delta.

Step 2 Delta-adjusted dividend: multiply the increase in dividend by the delta computed in step 1.

Step 3 New transaction value: subtract the delta-adjusted dividend computed in step 2 from the transaction value computed in step 1.

Step 4 New call strike price: solve for the new call strike price to achieve a transaction value equal to the new transaction value computed in step 3.

FIG. 5 illustrates such a computation assuming a 12-year 60% ($24)-200% ($80) equity collar, adjusting the call strike price for dividend increases.

Relationships Between Parties

Figure 6:
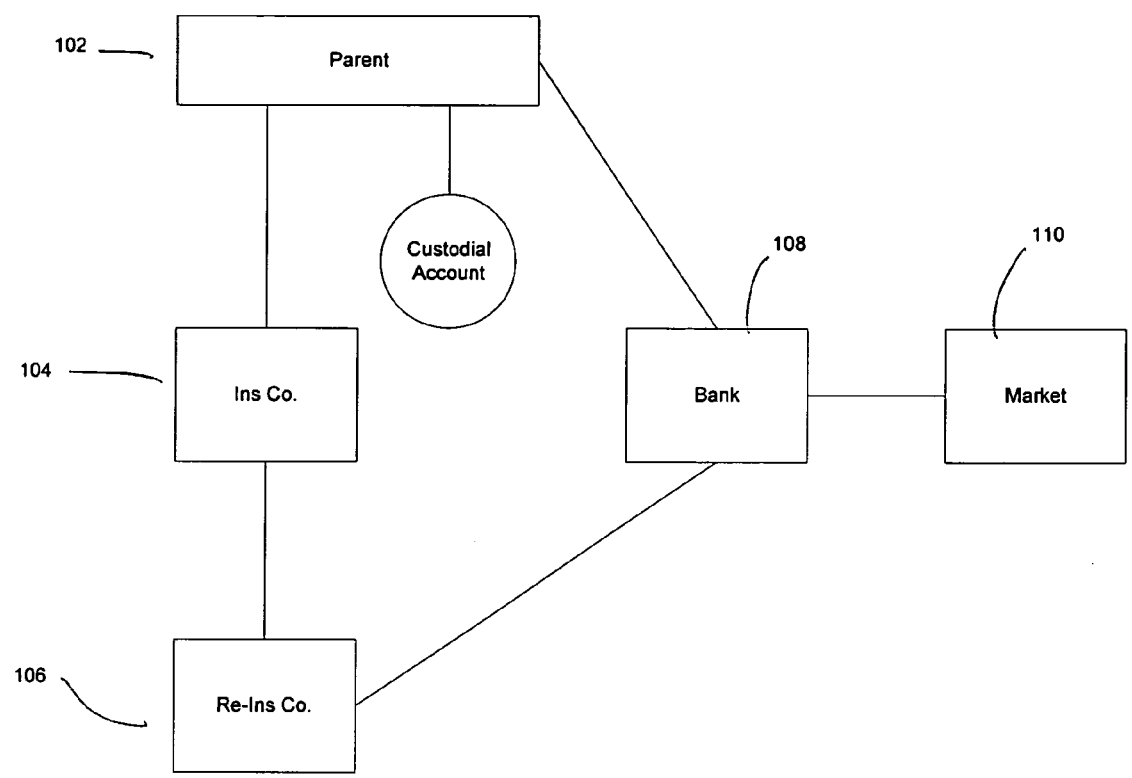
FIG. 6 illustrates an example of relationships between parties in an embodiment.

FIG. 6 illustrates relationships between company 102, entities 104 and 106, financial institution 108 and market 110 in an example embodiment.

Company 102 places a specified number of shares in a custodial account and then pledges those shares in support of the letter of credit. Company 102 and financial institution 108 enter into a 12-year zero cost equity collar that includes a call struck at 200% of the current company stock price, and a put struck at 60% of the current stock price. Financial institution 108 hedges with an initial registered short sale of 50% of the net underlying shares held in the custodial account, and dynamically hedges the collar over the term.

Insurance company 104 reinsures certain qualifying business (term or universal life policies) through re-insurance company 106. Re-insurance company 106 is completely owned by insurance company 104, and insurance company 104 transfers or pledges reinsured policy-related assets and/or premiums to re-insurance company 106. The reinsurance obligation is backed up by an assignment of the letter of credit proceeds.

The letter of credit is not drawn until there is an event requiring a draw on the letter of credit.

The transactions described above should be considered non-dilutive for GAAP purposes as long as the stock price does not increase above the call strike price (200% in the example).

In addition, the note underlying the letter of credit is automatically syndicated if the letter of credit is drawn. This helps to solve some tax issues, and allows deduction of interest.

Early Settlement

Figure 7:
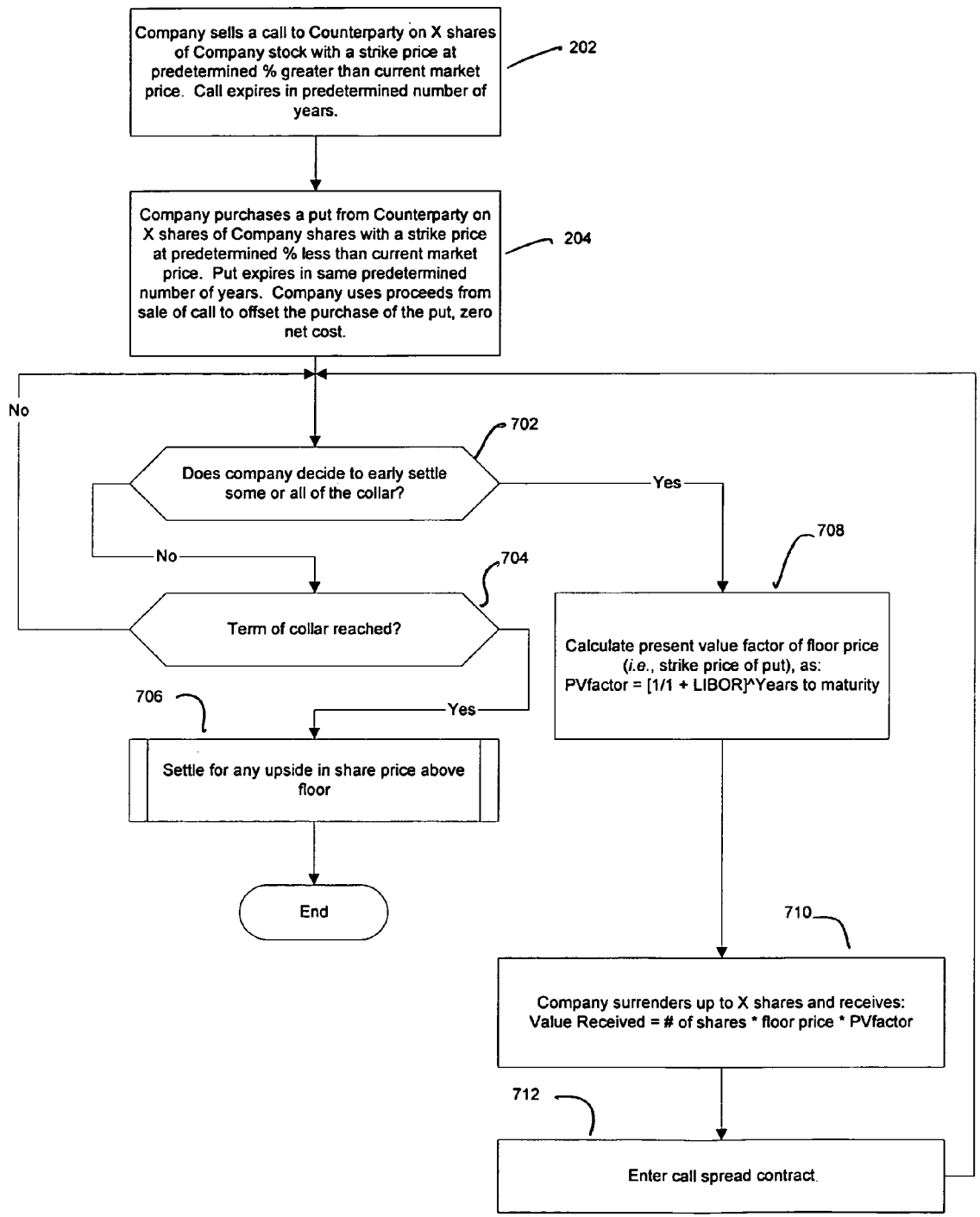
FIG. 7 illustrates an example method according to an embodiment.
Figure 8:
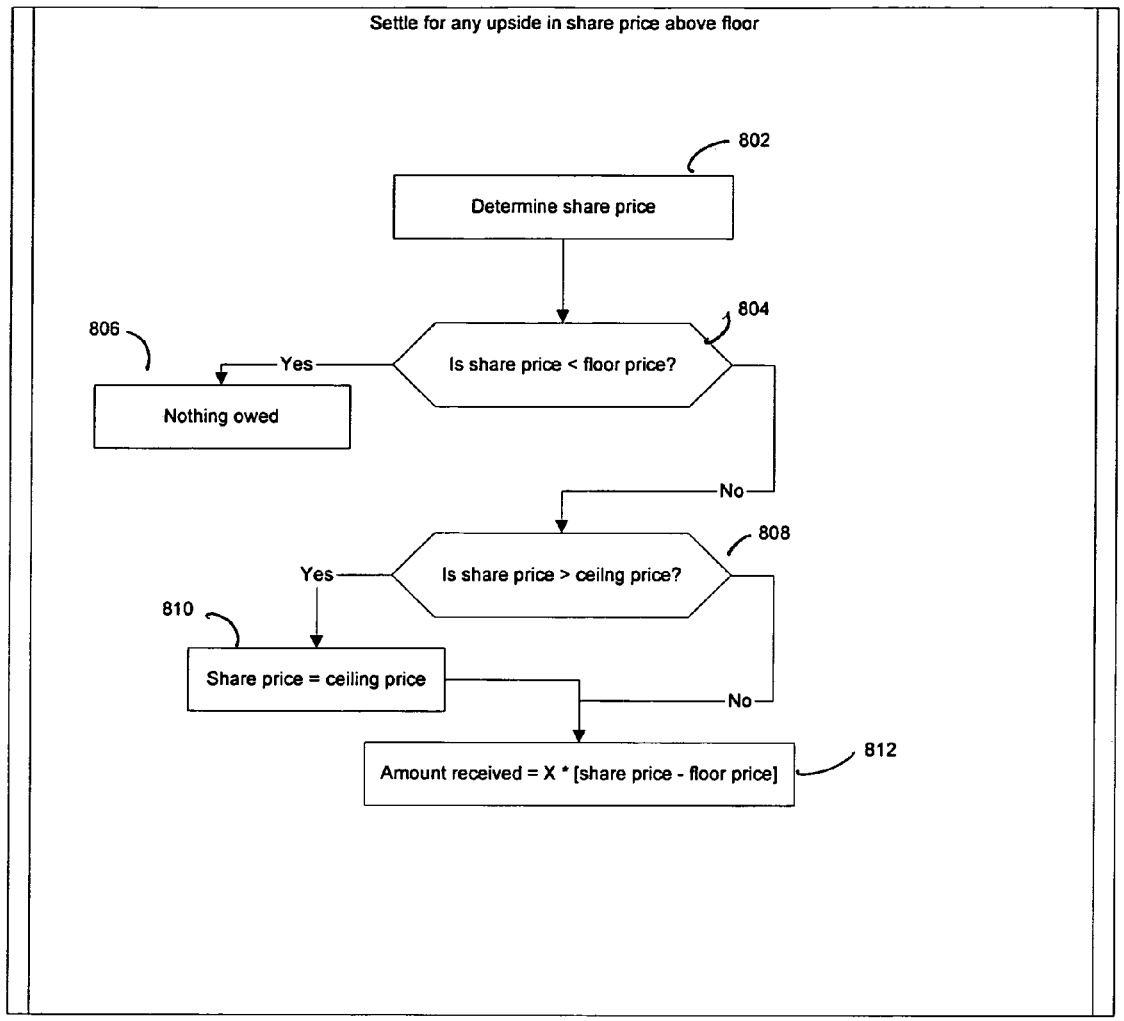
FIG. 8 illustrates an example method according to an embodiment.

FIG. 7 illustrates an embodiment wherein the company early-settles all or a portion of the equity collar. Steps 202 and 204 in FIG. 7 are the same or similar to the same numbered steps in FIG. 2. At step 702, system 100 determines whether company 102 desires to early-settle some or all of the equity collar. If company 102 determines not to early-settle some or all of the equity collar, then at step 704, system 100 determines whether the term of the equity collar has been reached, and if so, at step 706 settles for any upside in the share price above the floor. Step 706 includes additional steps that are illustrated in FIG. 8. If at step 704, system 100 determines that the term of the equity collar has not been reached, system 100 loops to step 702.

If at step 702, company 102 determines to early-settle some or all of the equity collar, then at step 708, system 100 calculates a present value factor of the floor price. The floor price is the strike price of the put. The present value factor is determined as:

$$PVFactor=[1/1+LIBOR]^{Years\_To\_Maturity}$$

At step 710, company 102 surrenders some or all of the shares and receives in exchange a value determined as the number of shares surrendered multiplied by the floor price multiplied by the present value factor.

At step 712, company 102 enters into a call spread contract, with one leg of the call contract priced at the value of the put strike price determined at step 204, and one leg of the call contract priced at the value of the call strike price determined at step 202. Then system 100 loops to step 702.

In FIG. 8, system 100 settles for any upside in the share price above the floor. At step 802, system 100 determines the share price, and then at step 804, system 100 determines whether the share price is less than the floor price. If so, then at step 806 nothing is owed because the share price is below the collar.

If at step 804, system 100 determines that the share price is above the floor price, then at step 808, system 100 determines whether the share price is above the ceiling price. If so, then at step 810, system 100 sets the share price equal to the ceiling price, and at step 812, system 100 determines the amount received by the company by multiplying the number of shares by the difference between the share price and the floor price.

If at step 808, system 100 determines that the share price is not above the ceiling price, then at step 812, system 100 determines the amount received by multiplying the number of shares by the difference between the share price and the floor price.

Extended Terms (Evergreen)

Figure 9:
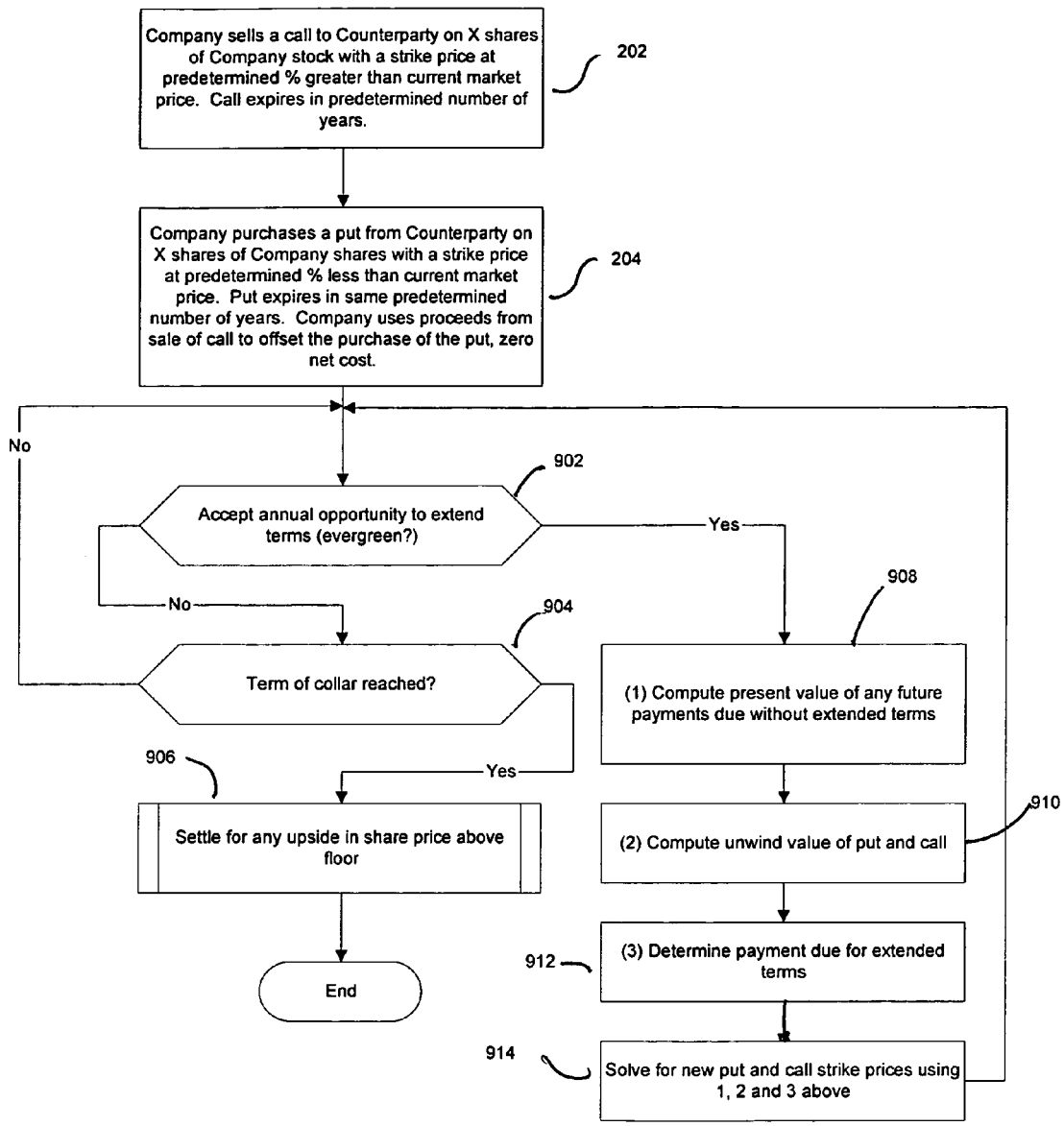
FIG. 9 illustrates an example method according to an embodiment.

FIG. 9 illustrates an embodiment wherein the company extends the terms of the equity collar. In one embodiment this occurs each year on the one year anniversary and if executed each year, will allow the structure to continue indefinitely.

Steps 202 and 204 in FIG. 9 are the same or similar to the same numbered steps in FIG. 2.

At step 902, system 100 determines whether company 102 elects to accept the opportunity to extend the terms of the collar. If company 102 determines not to extend the terms of the collar, then at step 904, system 100 determines whether the term of the equity collar has been reached, and if so, at step 906, system 100 settles for any upside in the share price above the floor. As with FIG. 7, step 906 includes additional steps illustrated in FIG. 8.

If at step 902, company 102 determines to extend the terms of the collar, then at step 908, system 100 calculates the present value of any future payments that would be due from the company under the collar without extended terms.

At step 910, system 100 calculates the unwind value of the collar, and at step 912, system 100 determines the additional payment due as a result of extending the term for an additional year.

At step 914, using the values calculated or determined at steps 908, 910 and 912, system 100 solves for a new put strike price and a new call strike price. This has the effect of extending the collar for an additional year, and system 100 then loops to step 902.

Although illustrative embodiments have been described herein in detail, it should be noted and will be appreciated by those skilled in the art that numerous variations may be made within the scope of this invention without departing from the principle of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. A method implemented at least partially in a programmed computer for managing risk associated with fluctuations in a company's share price, the method comprising:

using the programmed computer to sell a put to the company on a specified number of shares of stock of the company, the put including a strike price that is a predetermined percentage less than a market price of the shares of stock of the company; and using the programmed computer to purchase a call from the company on the specified number of shares of stock of the company, the call including a strike price that is a predetermined percentage greater than the market price of the shares of stock of the company.

2. A method according to claim 1, further comprising hedging the put by net short selling a predetermined number of shares of the stock of the company.

3. A method according to claim 2, wherein the predetermined number of shares is approximately fifty percent of the specified number of shares of the stock of the company.

4. A method according to claim 2, further comprising adjusting the hedge by buying or selling shares of the stock of the company.

5. A method according to claim 1, further comprising adjusting the call strike price down when the company pays a dividend on the shares of stock.

6. A method according to claim 1, wherein the put and the call have respective expiration terms, the method further comprising extending the expiration terms.

7. A method according to claim 6, wherein extending the expiration terms further comprises:

calculating a present value of any payments due from the company under the put and the call without extending the expiration terms;

calculating an unwind value of the put and call without extending the expiration terms;

calculating a present value of any payments due from the company under extended expiration terms; and solving for an extended term put strike price and an extended term call strike price using the present value of any payments due from the company under the put and the call without extending expiration terms, the unwind value of the put and call, and the present value of any payments due from the company under extended expiration terms.

8. A method according to claim 6, wherein extending the expiration terms occurs approximately one year after selling the put and purchasing the call.

9. A method according to claim 1, wherein the market price of the shares of stock of the company is a current market price.

10. A method according to claim 1, wherein the predetermined percentage less than a market price of the shares of stock of the company is between zero percent less and sixty percent less.

11. A method according to claim 1, wherein the put and the call have equal terms.

12. A method according to claim 1, wherein the put has a term between about ten years and twelve years.

13. A method according to claim 1, wherein the call has a term between about ten years and twelve years.

14. A method according to claim 1, wherein the predetermined percentage greater than the stock price is adjusted so that value received for the put and value paid for the call are approximately equal.

15. A method according to claim 1, wherein the predetermined percentage less than the stock price is adjusted so that value received for the put and value paid for the call are approximately equal.

16. A method according to claim 1, wherein the same counterparty sells the put to the company and purchases the call from the company.

17. A method according to claim 1, wherein the put and the call have respective expiration terms, the method further comprising receiving from the company shares of stock of the company before the expiration terms.

18. A method according to claim 17, further comprising delivering value to the company in exchange for receiving the shares of stock of the company.

19. A method according to claim 17, further comprising entering into a call spread contract with the company.

20. A method according to claim 19, wherein the put strike price is a floor price and the call strike price is a ceiling price, and wherein entering into the call spread contract further comprises:

entering into a first leg of the call spread with a first leg call strike price at the floor price; and entering into a second leg of the call spread with a second leg call strike price at the ceiling price.

21. A method according to claim 1, further comprising issuing a letter of credit with a value that is equal to the strike price of the put multiplied by the specified number of shares of stock.

22. A method according to claim 21, further comprising receiving a pledge from the company of the specified number of shares of stock.

23. A method according to claim 21, further comprising syndicating an instrument used to fund the letter of credit in the event the letter of credit is drawn.

24. A method according to claim 21, further comprising receiving a pledge of the put from the company.

25. A method according to claim 21, wherein the company places the specified number of shares of stock in a custodial account.

26. A method according to claim 21, wherein the letter of credit is a first letter of credit that is issued to an entity that is owned by the company.

27. A method according to claim 26, wherein the entity is newly formed by the company.

28. A method according to claim 26, wherein the entity is consolidated with the company.

29. A method according to claim 26, wherein the entity issues a second letter of credit to the company.

30. A method according to claim 26, wherein the entity is a reinsurance company.

31. A method according to claim 26, wherein the first letter of credit satisfies XXX or AXXX reserve requirements.

32. A method according to claim 21, wherein the letter of credit has a term between ten years and twelve years.

33. A method according to claim 21, wherein the put, the call, and the letter of credit have equal terms.

34. A system implemented at least partially in a programmed computer for managing risk associated with fluctuations in a company's share price, the system comprising:

computer system means for selling a put to the company on a specified number of shares of stock of the company, the put including a strike price that is a predetermined percentage less than a market price of the shares of stock of the company; and computer system means for purchasing from the company a call on the specified number of shares of stock of the company, the call including a strike price that is a predetermined percentage greater than the market price of the shares of stock of the company.

35. A computer-readable medium having computer executable software code stored thereon, the code for managing risk associated with fluctuations in a company's share price, the code comprising:

code to sell a put to the company on a specified number of shares of stock of the company, the put including a strike price that is a predetermined percentage less than a market price of the shares of stock of the company; and code to purchase a call from the company on the specified number of shares of stock of the company, the call including a strike price that is a predetermined percentage greater than the market price of the shares of stock of the company.

36. A programmed computer for managing risk associated with fluctuations in a company's share price, comprising:

a memory having at least one region for storing computer executable program code; and a processor for executing the program code stored in the memory, wherein the program code comprises:

code to sell a put to the company on a specified number of shares of stock of the company, the put including a strike price that is a predetermined percentage less than a market price of the shares of stock of the company; and code to purchase a call from the company on the specified number of shares of stock of the company, the call including a strike price that is a predetermined percentage greater than the market price of the shares of stock of the company.

* * * * *